United States Patent [19]

Czech et al.

[11] Patent Number: 4,890,356
[45] Date of Patent: Jan. 2, 1990

[54] HINGE FOR THE CONNECTION OF THE SHAFT OF A TEMPLE WITH A HINGE PIECE OF SPECTACLE FRAMES AS WELL AS A PROCESS FOR THE PRODUCTION OF SUCH A HINGE

[75] Inventors: Gunther Czech, Filderstadt; Joachim Baum, Rudersberg, both of Fed. Rep. of Germany

[73] Assignee: Eyemetrics-Systems AG, Postfach, Switzerland

[21] Appl. No.: 234,424

[22] Filed: Aug. 19, 1988

[30] Foreign Application Priority Data

Aug. 20, 1987 [DE] Fed. Rep. of Germany ....... 3727861

[51] Int. Cl.⁴ .......................... E05D 7/00; G02C 5/22
[52] U.S. Cl. ........................................ 16/228; 16/385; 16/386; 264/242; 264/250; 351/153
[58] Field of Search ......... 16/228, 385, 386, DIG. 42; 351/121, 153; 29/11; 264/242, 250, 255, 328.8

[56] References Cited

U.S. PATENT DOCUMENTS

| 3,000,049 | 9/1961 | Terry, Jr. .......................... 16/386 X |
| 3,156,756 | 11/1964 | Seaver ............................... 16/228 X |
| 3,591,669 | 7/1971 | Membry ........................... 264/242 X |
| 4,655,564 | 4/1987 | Czech .................................... 351/41 |
| 4,692,001 | 9/1987 | Anger .................................... 351/41 |

Primary Examiner—Richard K. Seidel
Assistant Examiner—William S. Andes
Attorney, Agent, or Firm—Roth & Goldman

[57] ABSTRACT

In the case of a hinge for the connecting of a temple shaft with a hinge piece of a spectacle frame, at least one hinge eye is located on only one of these elements (the hinge piece or the shaft of the temple). The hinge pin running through this eye is designed in one piece with the other element (the shaft of the temple or the hinge piece). For this purpose, either the hinge pin of plastic is injection molded into the opening of the hinge eye or the hinge eye of plastic is injection molded around the hinge pin. In this case, one preferably proceeds in such a manner that one of the two elements with the associated hinge eye or hinge pin is formed first and that this initially formed element forms a part of the surface of the cavity of the injection molding tool for the other element such that the other element is injection-molded directly onto the initially produced element. The high strength of this hinge prevents breakage due to wear and tear, which increases ins service life on the one hand and on the other hand conveys small dimensions to the hinge.

9 Claims, 1 Drawing Sheet

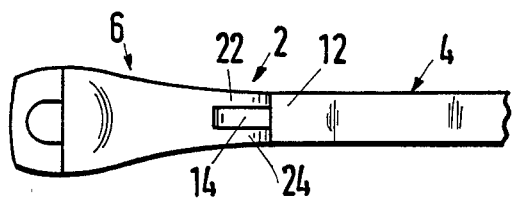
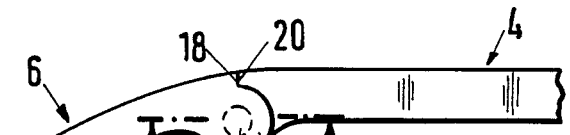
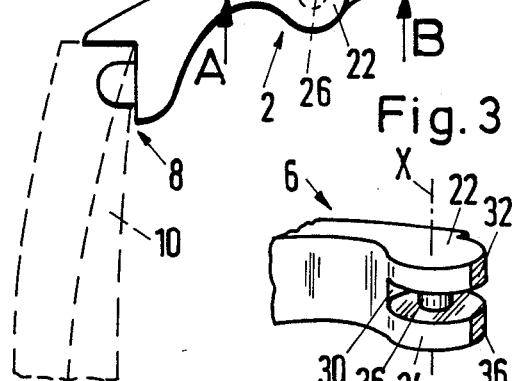
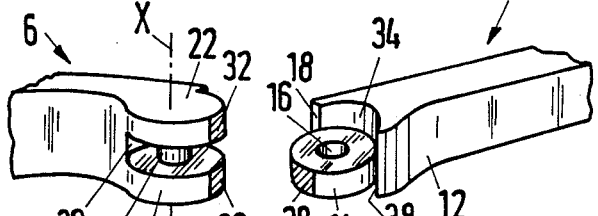
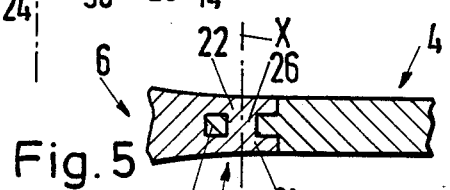
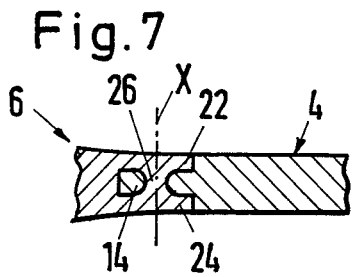
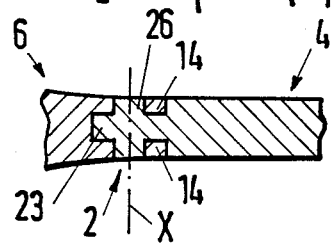
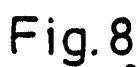
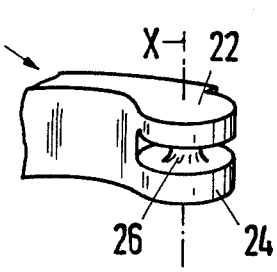
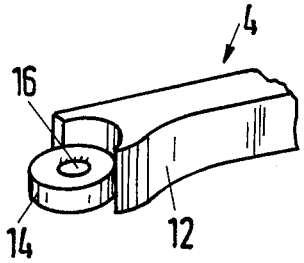

HINGE FOR THE CONNECTION OF THE SHAFT OF A TEMPLE WITH A HINGE PIECE OF SPECTACLE FRAMES AS WELL AS A PROCESS FOR THE PRODUCTION OF SUCH A HINGE

The invention relates to a hinge for connecting the shaft of a temple with a hinge piece of spectacle frames as well as a process for the production of such a hinge.

One presently preferred prior art temple hinge is known from U.S. Pat. No. 4,692,001, which issed Sept. 8, 1987 to Wilhelm Anger. In the case of the known hinge, both the spaced flanges as well as the shaft of the temple are provided with hinge eyes. The hinge bolt, which is manufactured as a separate piece, extends through the hinge eyes on the two elements and is secured in its position by means of a snap-fit connection made of a circular torus on the hinge bolt as well as a circular groove in one of the hinge eyes. In the case of the known hinge, the hinge piece, the shaft of the temple, the hinge eyes and the hinge bolts consist of plastic, in which case the hinge piece with spaced flanges on the one hand, the shaft of the temple with its hinge flange on the other hand and furthermore the hinge bolt are manufactured as separate parts by means of injection molding. After being formed by injection molding, these parts are assembled or mounted within one another. In the case of the suitable choice of the plastic, the known process allows the manufacture of a hinge of small dimensions and a low weight. A hinge of the described type is necessarily subject to a certain wear and tear when being used, a fact which can result in breakage of the hinge bolt or the hinge flanges. This limits the service life of a hinge of certain dimensions, respectively forces the enlargement of the stressed cross section is the service life is to be increased.

SUMMARY OF THE INVENTION

The invention is based on the objective to further develop the hinge of this type in such a manner that its resistance to wear and tear is increased as well as to create a process for the manufacture of such a hinge.

This objective is realized with respect to the hinge in accordance with the invention essentially on account of the fact that the hinge bolt and the second element are designed in one piece, in which case, for this purpose, either the hinge bolt is injection molded into the opening of the hinge eye, while, at the same time, the second element is formed by injection molding as a unit with the hinge bolt, or the hinge eye is formed by injection molding around the bolt, which was previously manufactured in one piece with the second element.

As a result of the "single-piece" design of the hinge bolt with the second element, a hinge eye on the second element is no longer necessary. Consequently, the danger is breakage of the hinge eyes on the second element, which is present in the case of this type of hinge, has also been eliminated, such that the resistance to wear and tear is reduced for this reason alone. In addition, it has been shown that the danger of breakage of the hinge bolt—for the same dimensions—has also been reduced, which results in a further increase of the resistance to wear and tear. Finally, in the case of the hinge in accordance with the invention it is also no longer necessary to manufacture the hinge bolt separately and to assemble the hinge by inserting the hinge bolt, such that the manufacture and the assembly of the hinge has been simplified as a result of the design in accordance with the invention.

In an advantageous design of the invention it can be provided for the transitions between the segment of the hinge bolt, which is located in the opening of the hinge eye, and the second element to be rounded off. This makes possible larger stressed cross sections of the hinge bolt in the domain of the transitions and reduces the stress peaks in those locations.

In the case of the hinge according to the invention, the components formed by means of injection molding, in other words the hinge bolt and the second element or the at least one hinge eye, necessarily consist of a plastic that can be injection molded. The other components of the hinge can consists of a different material, for example a metallic material. Preferably, however, all components of the hinge consist of plastic, in which case again preferably the at least one hinge eye and the first element are designed as a single piece. In that case is must then be insured that during the injection molding of the hinge bolt in the opening of the hinge eye, respectively during the injection molding of the hinge eye around the hinge bolt, the materials, of which the hinge eye and the hinge bolt are made, do not enter into a connection between the materials so that the mobility of the hinge is guaranteed.

Preferably, the glass transition temperatures of the plastics used for the at least one hinge eye and the hinge bolt are so far apart that, at the processing temperature of the component to be formed by means of injection molding (hinge eye or hinge bolt), the surface of the other component (hinge bolt or hinge eye) does not begin to melt or is deformed. For this purpose, the difference of the glass transition temperatures is preferably at least 40 degrees C. The mobility of the hinge, however, can also be guaranteed on account of the fact the plastics are incompatible with one another at the stated processing temperature.

The at least one hinge eye can be located on the hinge piece as well as on the shaft of the temple; preferably, however, it is designed to be located in the shaft of the temple.

The increased resistance to wear and tear of the hinge according to the invention allows the manufacture of hinges with relatively small dimensions and a long service life. Preferably, the height of the hinge in the direction of the hinge axis is less than 5 mm, in particular 4 mm.

This objective is realized by process means in which initially either the first element, in other words the element provided with the at least one hinge eye, or the second element, in other words the element which is formed in one piece with the hinge bolt, is manufactured and that during the injection molding of the respectively other element the initially manufactured element is placed into the injection molding tool therein limiting the molding cavity for the yet to be injection molded element in those areas in which the two elements as well as the hinge bolt and the hinge eyes on the finished hinge touch, in other words so that they are formed in a complimentary fashion with respect to one another. Consequently, one element is injection-molded against the other, in which case, however, care is taken as a result of the suitable choice of the materials and/or the process parameters that are used, for example the processing temperature of the plastic of the other, later manufactured element that the two elements as well as the hinge eyes and the hinge bolt do not enter into a connection with one another so that the mobility of the hinge is insured.

Further advantageous embodiment of the invention result on following description of examples.

Hinges for the connection of the shaft of a temple with another hinge piece of a spectacle frame, in which case the hinge bolt and the hinge eyes all consist of plastic and in which case the hinge bolt and the second element, in other words the element connected to the hinge bolt, are designed in one piece, are generally known French Patent Nos. (FR-PS 954 467, FR-PS 1 126 049, U.S. Pat. No. 4,153,347). In these known cases, however, either the hinge bolt is interrupted in the direction of the hinge axis (FR-PS No. 954 467; U.S. Pat. No. 4 153 347 (FIG. 4) or the hinge eyes are interrupted in the circumferential direction (FR-PS No. 1 126 049). This results in a considerable weakening of the hinge bolt respectively of the hinge eyes, which forces the creation of correspondingly large dimensions in order to achieve a sufficient strength and rigidity. In addition, in none of these known cases is the hinge bolt injected molded into the opening of the hinge eyes or is the respective hinge eye injection molded around the hinge bolt.

BRIEF DESCRIPTION OF THE DRAWING

FIG. 1 is a top view of a first embodiment of a hinge in accordance with the invention together with a hinge piece and the proximal end of the shaft of a temple;

FIG. 2 is a side view of a hinge according to FIG. 1, in which case a segment of an eye glass, illustrated by dotted lines in FIG. 1, is left out;

FIG. 3 is a perspective, segmental view of a hinge piece of the hinge according to FIGS. 1 and 2;

FIG. 4 is a perspective, segmental view of the shaft of a temple of the hinge according to FIGS. 1 and 2;

FIG. 5 is a sectional illustration according to A-B in FIG. 1;

FIG. 6 is a sectional illustration corresponding to FIG. 5 of an altered embodiment of the first example of an embodiment;

FIG. 7 is a sectional illustration corresponding to FIG. 5 of a second example of an embodiment of the hinge according to the invention;

FIG. 8 is a perspective, segmental view corresponding to FIG. 3 of the hinge piece of the second example of an embodiment; and FIG. 9 is a perspective, segmental view corresponding to FIG. 4 of the shaft of the temple of the second example of an embodiment.

DESCRIPTION OF THE PREFERRED EMBODIMENT

Examples of embodiments of the invention are illustrated in the drawings and are explained in more detail in the following.

A hinge 2 of a spectacle frame, illustrated in FIGS. 1 to 5, forms a hinged connection between a shaft of a temple 4 and a hinge piece 6. The hinge piece 6 is tightly and rigidly connected with the spectacle glass 10 by means of the attachment device 8, with said spectacle glass being shown only in dotted lines and segmentally in FIG. 1. Since the design of the attachment device 8 is not essential for the invention presented here, the attachment device 8 is not explained in more detail at this point.

Formed in one piece at the proximal end 12 of the shaft of the temple 4 is a hinge eye or flange in the form of a closed, uninterrupted ring with a central opening 16. When viewed in the direction of the hinge axis x, the hinge eye 14 is located at about half height of the anterior end 12 of the shaft of the temple 4 and the hinge eye 14 itself has about one third of the height of the anterior end 12 of the shaft of the temple 4. Furthermore, a stop face 18 is formed at this anterior end, with said stop face acting in cooperation with a complimentarily formed stop face 20 on the hinge piece 6 in order to prevent that the shaft of the temple 4, relative to the hinge piece 6 can be swiveled counter clockwise (in FIG. 1) past the position shown in FIG. 1.

Two disk-shaped plates or flanges 22 and 24 are molded to the hinge piece 6, which have the same diameter as the ring forming the hinge eye 14. With respect to their shape, these two plates 22 and 24 differ from the hinge eye only on account of the fact that they exhibit no opening corresponding to the opening 16. The two plates 22 and 24 are located on the hinge piece 6 with a gap between them, the height of which, in the direction of the hinge axis, equals the height of the hinge eye 14. In the operational state of the hinge 2, the hinge eye 14 and the two plates 22 and 24 are flush on top of one another in the direction of the hinge axis x.

A hinge bolt 26 is designed in one piece with the two plates 22 and 24, with said hinge bolt sitting flush in the opening 16 of the hinge eye 14 and being uninterrupted in the direction of the hinge axis x. The segment of the hinge bolt 26 located in the opening 16 has a circular-cylindrical profile in the case of the example of an embodiment shown in FIGS. 1 to 5.

FIG. 3 shows the hinge piece 6 in one piece with the plated 22 and 24 as well as the hinge bolt 26, which is molded to the hinge piece 6 in one piece. FIG. 4 shows the anterior end of the shaft of the temple 4 with the molded-on hinge eye 14. It must be pointed out that the defined hinge 2 cannot be taken apart into the hinge piece according to FIG. 3 and the shaft of the temple according to FIG. 4, because the temple shaft 26 is molded to the hinge piece 6 and the hinge eye 14 is designed as a closed ring. Even prior to the assembly of the hinge piece 6 and the temple shaft 4, these elements do not both have the design illustrated in FIGS. 3 and 4. These figures merely serve the purpose to show the geometry and design of each element by itself.

Once the temple shaft 4 and the hinge piece 6 assume the relative position with respect to one another shown in FIGS. 1 and 2, individual surfaces of the temple shaft 4 and of the hinge eye 14 on the one hand as well as of the hinge piece 6, the plates 22 and 24 and the hinge bolt 26 on the other hand touch one another. This contact surface on the temple shaft 4 and on the hinge eye 14 are marked in FIGS. 3 and 4 as shaded portions. The top surface of the hinge eye 14 and the bottom surface of the top plate 22 are touching as are the bottom surface of the hinge eye 14 and the top surface of the botoom plate 24, the superficies of the segment of the hinge bolt 26 located in the opening 16 and the surface of the opening 16, the two stop faces 18 and 20, a segment of the superficies of the hinge eye 14 and a surface segment 30 of the hinge piece 26, a segment 32 of the superficies of the top plate 22 and a surface segment 34 on the temple shaft 4 as well as a segment 36 of the superficies of the bottom plate 24 and a surface segment 38 on the temple shaft 4. Consequently, these paired, touching surfaces are shaped in a complimentary fashion with respect to one another.

The previously described hinge is produced in the following manner for example:

First of all, the shaft of the temple 4 with the molded-on hinge eye or flange 14 is produced, which can be achieved, for example, by means of injection molding of a suitable plastic. Then the hinge piece 6 wih the hinge bolt 26, which is molded on in one piece, is produced by means of the injection molding of a suitable plastic. For this purpose, the already produced shaft of the temple 4 with the hinge eye 14 is placed into the not illustrated injection molding tool for the hinge piece 6 that the shaft of the temple 4 partially forms the border of the not illustrated molding cavity for the hinge piece 6. In other words, the previously explained contact surfaces, which are shown in dashed lines in FIG. 4, form the surfaces of the molding cavity for the hinge piece and limit it in those areas, which define the contact surfaces shown in dashed lines in FIG. 3 and form those contact surfaces during the injection molding process. The plastic for the hinge piece 6 is then injected into the molding cavity defined in this manner. This then generates the formation of not only the hinge piece 6 but the two plates 22 and 24 as well as the hinge bolt are formed, since the plastic for the hinge bolt 16 flows into the opening 16, respectively is injected into this opening (also see FIG. 5).

Consequently, a hinge results from only two separately produced components, namely the hinge bolt 26 on the one hand and the plates 22 and 24, which are formed in one piece with said hinge bolt, with said plates themselves being formed in one piece with the hinge piece 6, and on the other hand the hinge eye 14, which is formed in one piece with the shaft of the temple 4. The two plates 22 and 24 do not exhibit a central opening and as a result of this alone have a higher stability than a conventional hinge eye with an opening. Furthermore, it was shown that the single-piece design between the plates or flanges 22 and 24 on the one hand and the hinge bolt 25 on the other hand results in a hinge bolt 26 that can withstand higher stresses than in the case that for the same dimensions and materials, the hinge bolt would have been formed by itself and would be sitting in conventional, plates 22 and 24 replacing hinge eyes.

In the case of the just described example of an embodiment, only one hinge eye or flange is provided on the temple shaft 4. It goes without saying that instead of only one hinge 14, it is also possible for 2 or more hinges to be formed on the shaft of the temple 4 and correspondingly for three of more disks to be present on the hinge piece 6.

In the case of the previously described example of an embodiment, the temple shaft 4 with the hinge eye 14 is the initially produced element and the hinge piece 6 with the molded-on hinge bolt 26 is the other, later formed element. It should be evident from the preceding description that these elements can also be formed in the reverse order: the hinge piece 6 with the hinge bolt 26 can be molded and produced in one piece initially and be placed in an injection molding tool for the temple shaft 4 and the hinge 14 in such a manner that it partially limits the molding cavity with its contact surfaces shown as the shaded portions in FIG. 3. In this case, the temple shaft 4 and the hinge eye 14 then consist of an injection moldable plastic, in which case the plastic is injected around the hinge bolt 26 during the injection molding process thereby forming the hinge eye 14.

In the case of the example of an embodiment described above, the hinge eye 14 is designed to be located on the shaft of the temple 4, which consequently represents the "first" element in the sense of the claims in this example of an embodiment. Consequently, concerning the described example of an embodiment, the hinge piece 6 is the "second" element in the sense of the claims. It is also possible, however, that the hinge piece 6 forms the first element with the hinge eye, respectively numerous hinge eyes and consequently that the shaft of the temple 4 forms the second element, with which the hinge bolt is designed in one piece. An example for this is shown in FIG. 6 as a variation of the example of an embodiment described first. In this case, the hinge piece 6 exhibits two hinge eyes 14, namely an upper hinge eye and a lower hinge eye, while on the temple shaft 4, in place of the design according to FIGS. 1 to 5, a plate 23, similar to the plates 22 to 24 is located on the temple shaft 3, with said plate 23 being formed in one piece with the hinge bolt 24. With respect to the process for the production of this variation, that stated with respect to the first example of an embodiment applies.

A second example of an embodiment is illustrated in FIGS. 7 to 9, which said embodiment being described in the following only with respect to the different to the first example of an embodiment. The reference numbers as used in the first example of an embodiment are used for the same, respectively corresponding parts. The uniqueness of the second example of an embodiment as compared to the first example of an embodiment consists of the fact that the segment of the hinge bolt 26, which is located in the opening 16 of the hinge eye 14, in a axial section, has the shape of a centrally constricted roller, such that the transitions between the segment of the hinge bolt 26 located in the opening 16 and the two plates 22 and 24 and consequently the hinge piece 6 are rounded off. With otherwise the same dimensions as in the case of the first example of an embodiment, this particular design according to FIGS. 7 to 9 makes it possible to provide the hinge bolt 26 with a greater cross-sectional area in the domain of the rounded-off transitions and a smaller cross-sectional area in the domain of the greatest constriction such that, on the one hand, the cross-sectional surface of the hinge bolt, which is mainly subject to shearing, is enlarged, while, on the other hand, the cross-sectional area of the hinge eye 14, which is seen in FIG. 7 (on account of the constriction of the hinge bolt) can also be enlarged. Both measures increase the resistance to stress of the hinge and prevent the danger of breakage. In this context it should be noted that the hinge eye 14 and the hinge bolt 26 are in contact also in the domain of the constriction of the hinge bolt and that the space available in the domain of the constriction is utilized for the hinge eye 14. This would not be possible in the case of the conventional hinge with a separately produced, inserted hinge bolt.

In the case of the examples of embodiments described above, all components of the hinge as well as the hinge piece 6 and the shaft of the temple 4 consist of plastic. One of these two elements, namely the initially produced element with the associated hinge eye, respectively hinge bolt, however, need not consist of plastic, but rather call also consist of a metallic material for example.

Preferably, however, all components of the element and in addition the hinge piece 6 as well as the shaft of the temple 4 consist of a plastic material. In this case, care has to be taken to ensure that no material connection is formed during the injection molding of the hinge bolt into the hinge eye, respectively of the hinge eye around the hinge bolt and furthermore also that no deformation occurs in the area of the contact surfaces of the initially produced element and the other element. This is preferably achieved on account of the fact that the plastic of the initially produced element has a higher glass transition temperature than that of the plastic of the element injection molded thereafter such that the processing temperature of the subsequently injection molded element can be correspondingly lower than the processing temperature of the initially produced element.

A polyetherimide material, as that described in U.S. Pat. No. 4,655,564, which issued Apr. 7, 1989 to Gunther Czech, is particularly well suited as a material for the initially produced element. An example for such a polyetherimide material is the material distributed by the General Electric Corporation under the name "Ultem" with a glass transition temperature in the range from 210 to 230 degrees C., which is preferably processed at a processing temperature of about 390 degrees C. Another material suitable for the production of the initially produced element is a polyethersulfone material, for example of the type distributed by BASF under the name "Ultrason E". This material has a glass transition temperature in the range from 200 to 210 degrees C. and is preferably processed at a processing temperature of 370 degrees C. Amorphous, aromatic polyester carbonates, for example those distributed by the Bayer Corporation under the names "Apec-KU" and "Apec-KL", which are described in the publications "Anwendungstechnische Information No. 460/83" as well as "Anwendungstechnische Information No. 538" of the Bayer Corporation are suitable materials for the other element, which is formed later by means of injection molding. These materials are preferably processed at a processing temperature of 340 degree C. In addition, a polycarbonate material of the kind distributed by the Bayer Corporation under the name of "Makralon", which is described in the publicaction "Richtwerte von Makralon", order number KU 461000a, of the Bayer Corporation is suitable for the element produced later by means of injection molding. This polycarbonate material has a glass transition temperature of about 140 to 150 degrees C. and is preferably processed as a processing temperatrure of 300 degrees C. The pairings of "Ultem"/"Apec-KL", "Ultem"/"Makrolon" and "Ultrason"/"Makrolon" have yielded excellent results and reliably functioning hinges in tests. In these tests, "Ultem 1010" was used, which was injected at a mold temperature of 150 degrees C. The polyestercarbonate material was "APE-KL-1-9310", which was injected at a mold temperature of 100 degrees C. The polycarbonate material was "Makrolon 2805", which was injected at a mold temperature of 120 degrees C. and the polyethersulfone material was "Ultrason E 2000", which was injected at a mold temperature of 130 degree C. The processing temperatures were the respective processing temperatures stated above. The mentioned materials are particularly well suited for components of spectacle frames.

The polyetherimide material "Ultem" is used preferentially in the case of the shaft of the temple 4.

In the case of an hinge for the connecting of a temple shaft with a hinge piece of a spectacle frame, at least one hinge eye is located on only one of these elements (the hinge piece or the shaft of the temple). The hinge pin running through this eye is designed in one piece with the other element (the shaft of the temple or the hinge piece). For this purposes, either the hinge bolt of plastic is injected molded into the opening of the hinge eye or the hinge eye of plastic is injected molded around the hinge bolt. In this case, one preferably proceeds is such a manner that one of the two elements with the associated hinge eye or hinge bolt is formed first and that this initially formed element forms a part of the surface of the cavity of the injection molding tool for the other element such that the other element is injection-molded directly onto the initially produced element. The high strength of this hinge prevents breakage due to wear and tear, which increases its service life on the one hand and on the other hand conveys small diménsions to this hinge.

We claim:

1. A hinge for the connection of a temple shaft to a hinge piece of a spectacle frame, with at least one hinge eye in the form of an uninterrupted ring, which is attached to a first of the two connected elements, and with a hinge bolt, uninterrupted and having the shape of a cylinder constricted in the middle in axial section, with said hinge bolt extending through the opening of the hinge eye and extending between two plates on the second of the two connected element, in which case at least the hinge bolt or the hinge eye comprises a plastic that is injection molded, the hinge bolt and the second element being designed in one piece and that either the hinge bolt comprised of the plastic is injection molded into the opening of the hinge eye or that the hinge eye comprised of the plastic is injection molded around the hinge bolt.

2. A hinge according to claim 1, characterized by the fact that the transitions between the segment of the hinge bolt, located in the opening of the hinge eye, and the second element are rounded off.

3. A hinge according to claim 1, characterized by the fact that the at least one hinge eye and the first of the two elements are formed in one piece.

4. A hinge according to claim 3, characterized by the fact that the first element with the hinge eye and the second element with the hinge bolt are comprised of different plastics which do not engage in a combination of the materials during the injection molding.

5. A hinge according to claim 4, characterized by the fact that the two plastics are incompatible at the processing temperature of the plastic of the injection molded hinge eye.

6. A hinge according to claim 4 characterized by the fact that one of the plastics of the injection molded hinge has a glass transition temperature which is at least 40 degrees C. lower than the glass transition temperature of the other plastic.

7. A hinge according to any one of claims 1, 2, or 3 through 8 characterized by the fact that the at least one hinge eye is attached to the shaft of the temple.

8. A hinge according to any one of claims 1, 2, or 3 through 8 characterized by the fact that the at least one hinge eye is attached to the hinge piece.

9. A hinge according to claim 6, characterized by the fact that the height of the hinge in the direction of the axis of the hinge (x) is less than 8 mm.

* * * * *